(12) United States Patent
LeRoy et al.

(10) Patent No.: US 6,452,122 B1
(45) Date of Patent: Sep. 17, 2002

(54) PRESSURE SENSING DEVICE

(76) Inventors: Peter C. LeRoy, 106 Harbor Lights Dr., Salem, SC (US) 29676; Alex J. Adams, 208 Apollo Dr., Seneca, SC (US) 29672

( * ) Notice: Subject to any disclaimer, the term of this patent is extended or adjusted under 35 U.S.C. 154(b) by 0 days.

(21) Appl. No.: 09/538,310

(22) Filed: Mar. 30, 2000

Related U.S. Application Data
(60) Provisional application No. 60/127,040, filed on Mar. 31, 1999.

(51) Int. Cl.[7] .......................... H01H 35/24; H01H 35/34
(52) U.S. Cl. .................... 200/83 A; 200/83 J; 200/835; 200/835 A
(58) Field of Search ........................... 200/83 R–83 SA

(56) References Cited

U.S. PATENT DOCUMENTS

| | | | | |
|---|---|---|---|---|
| 3,591,741 A | * | 7/1971 | Tutthill ........................ 200/83 |
| 3,786,211 A | * | 1/1974 | Popp ........................ 200/83 T |
| 3,852,547 A | * | 12/1974 | Dietz ........................ 200/83 Y |
| 4,286,127 A | * | 8/1981 | Quitoschinger ............ 200/83 J |
| 4,827,095 A | * | 5/1989 | Clark et al. ................ 200/83 J |
| 4,932,120 A | * | 6/1990 | Everett ........................ 29/622 |
| 5,140,113 A | | 8/1992 | Machado .................... 200/83 J |
| 6,236,295 B1 | * | 5/2001 | Healy ........................ 335/205 |

* cited by examiner

*Primary Examiner*—Michael Friedhofer
(74) *Attorney, Agent, or Firm*—Kilpatrick Stockton LLP

(57) ABSTRACT

An improved differential pressure switch has its supply pressure (a.k.a. the "high side") connected to the high pressure side of a filtration unit and its downstream (a.k.a. the "low side") connected to the low pressure port of a fluid filtration unit. As the filter becomes clogged a diaphragm within the improved differential pressure switch flexes, moving the actuator against spring resistance, which causes a pivoting motion of an actuator arm thus tripping the electrical switch.

14 Claims, 8 Drawing Sheets

Fig. 3
SWITCH OPEN
(NORMAL POSITION)

- COMPRESSION SPRING 60
- SWITCH 90 (OPEN)
- O-RING 109
- ROCKING ACTUATOR SHAFT 50
- 51
- 70
- O-RING 109
- 52
- LINEAR ACTUATOR 40
- HIGH PRESSURE REGION 201R
- LOW PRESSURE REGION 202R
- gap "G"

Fig. 4
SWITCH TRIGGERED
(PRESSURE DIFFERENTIAL REACHED)

- COMPRESSION SPRING 60
- SWITCH 90 (CLOSED)
- 109
- O-ring 109
- LOW PRESSURE REGION 202R
- 201R

ADJUSTING SCREW 80 AND SPRING 60 REMOVED

PRESSURE SENSING DEVICE

RELATED APPLICATION

This application both claims the benefit of and incorporates by reference pending provisional patent application Ser. No. 60/127,040, filed Mar. 31, 1999.

TECHNICAL FIELD

The present invention relates generally to pressure sensing devices, and particularly relates to a fluid pressure differential sensing device for use with, for example, pressurized air systems.

BACKGROUND OF THE INVENTION

Pressure sensing devices are known in the art for determining pressures of fluids and gases.

A differential pressure switch is an indicating device used to give a signal when an in-line filter becomes clogged.

A typical application would be sensing a clogged air line filter, or any other fluid, including liquids such as water or oil.

Although pressure differential switches are known in the art, there is always a need in the art for improvements.

SUMMARY OF THE INVENTION

The present invention overcomes deficiencies in the art by providing an improved fluid differential pressure switch having its supply pressure (a.k.a. the "high side" or "high pressure zone") connected to the high pressure side of an air filtration unit and its downstream (a.k.a. the "low side" or "low pressure zone") connected to the low pressure port of an air filtration unit. As the filter becomes clogged, a diaphragm within the improved differential pressure switch flexes, moving the actuator against spring resistance, which causes a pivoting motion of an actuator arm thus tripping the electrical switch.

Generally described, an apparatus for use within an environment capable of having a fluid pressure differential between two locations, the apparatus comprising a body defining a high pressure port and a low pressure port, the body also defining a high pressure zone in communication with the high pressure port, the body also defining a low pressure zone in communication with the low pressure port, a diaphragm partially defining the high pressure zone and partially defining said low pressure zone, the diaphragm being deformed to different shapes depending on the pressure differential between the high and low pressure zones, a switch having an open and a closed position, the switch being isolated from both the high and low pressure zones, and the switch operated in response to the deformation of the diaphragm such that the switch is switched between the open and closed positions when the pressure differential reaches a predetermined level.

Therefore it is an object of the present invention to provide an improved differential pressure switch.

Therefore it is an object of the present invention to provide an improved differential pressure switch which can be used with an air filtration unit.

It is a further object of the present invention to provide an improved differential pressure switch which is reliable in operation.

It is a further object of the present invention to provide an improved differential pressure switch which is simple in operation.

It is a further object of the present invention to provide an improved differential pressure switch which is efficient in operation.

It is a further object of the present invention to provide an improved differential pressure switch which is relatively low in cost.

It is a further object of the present invention to provide an improved differential pressure switch which is relatively simple in operation.

It is a further object of the present invention to provide an improved differential pressure switch which is relatively simple to assemble.

It is a further object of the present invention to provide an improved differential pressure switch which does not tend to leak.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIGS. 3 and 4 are illustrative views of a particular portion of the apparatus 10. FIG. 3 shows the portion in a normal, unswitched, position, in which the spring pressure maintains the rocking actuator shaft 50 such that the switch 90 is open. However, when the pressure on the diaphragm 30 become relatively greater as discussed later, as shown in FIG. 4, the switch 90 is closed.

DETAILED DESCRIPTION OF THE PREFERRED EMBODIMENT

Figure 1:
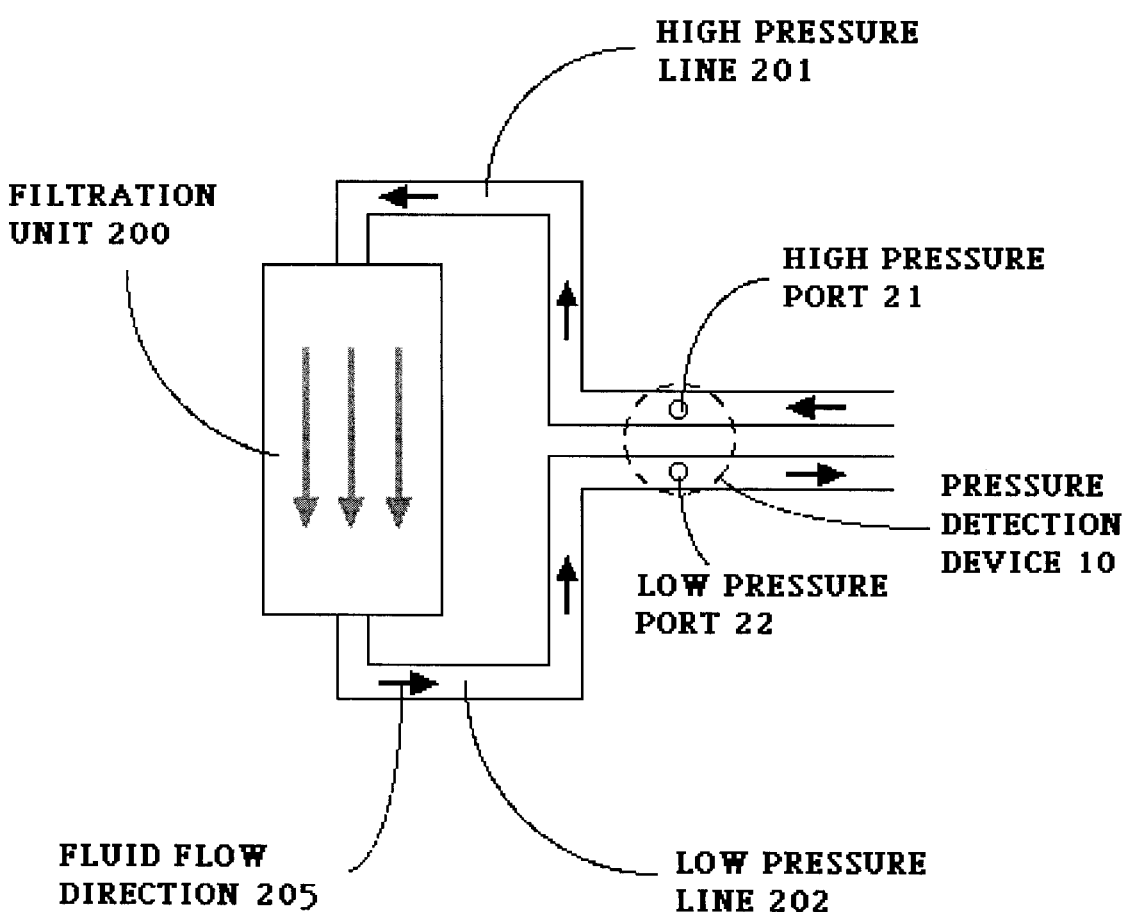
FIG. 1 is an illustrative view showing the pressure sensing (a.k.a. "detection") apparatus 10 used in conjunction with a filtration unit 200 supplied with fluid from a high pressure line 201 and drained from a low pressure line 202. Fluid flow direction is designated by arrows such as 205.

Reference is now made to the figures, in which like numerals indicate like elements throughout the several views. For purposes of explanation, the device will be assumed to be in an "upright" position as FIG. 1 is viewed.

General Construction and Operation

The apparatus according to the present invention monitors the pressure between two locations of a filtration unit 200 (see FIG. 1), and provides a closed switch in response to detection of a predetermined difference between the pressures at said two locations. As such a pressure differential could mean that the filtration unit is clogged, such a closed switch could be used to provide a signal as known in the art that the filtration unit needs service.

The differential switch according to the invention is a single-diaphragm style with an electrical switch which is fully isolated from any system pressure or media. This isolation is provided by use of a relatively frictionless design including an O-ring which accommodates pivoting of a rocking actuator shaft having one end attached to a reciprocating actuator and its other end attached relative to a microswitch. Variations in the sensed pressure differential results in linear movement of the linear actuator, which in turn causes pivoting of the rocking actuator shaft which, at some point, causes actuation of the microswitch.

The apparatus 10 is configured to work as a pressure sensing device in an overall environment such as set forth generally as FIG. 1. FIG. 1 is an illustrative view showing the pressure sensing apparatus 10 used in conjunction with a filtration unit 200 supplied with fluid from a high pressure line 201 and drained from a low pressure, line 202. Fluid flow direction is designated by arrows such as 205.

The filtration unit 200 is in one embodiment an air filtration unit, such as used to filter air supply systems. However, the concept could also be applied to other fluids, including gaseous or liquid fluids, including but not limited to water and oil.

The Elements

The pressure sensing apparatus 10 according to the present invention (a.k.a. the "device" 10) includes the following elements or features:

Casing 11
  Joint 12
  Threaded holes 15
  Mounting holes 16
Diaphragm Retaining Cap 20
  High pressure inlet port 21
  Low pressure inlet port 22
  Cross-hole 21A
  Cross-hole 22A
  Cross-hole 22B
  Attachment screw 25
  Slot 29
Diaphragm 30
Gland 35
Linear actuator 40
Rocking actuator shaft 50
  Shaft body 51
  Shaft ball end 51
Spring 60
Spring guide 70
  Spring guide dimple 71
Adjusting screw 80
Electrical switch 90
  Electrical Leads 91
O-Ring 102
O-Ring 103
O-Ring 104
O-Ring 105
O-Ring 107
O-Ring 109
Filtration unit 200
High Pressure Line 201
  Low Pressure Line 202
  Fluid flow direction 205

Construction and Assembly Details

Figure 2:
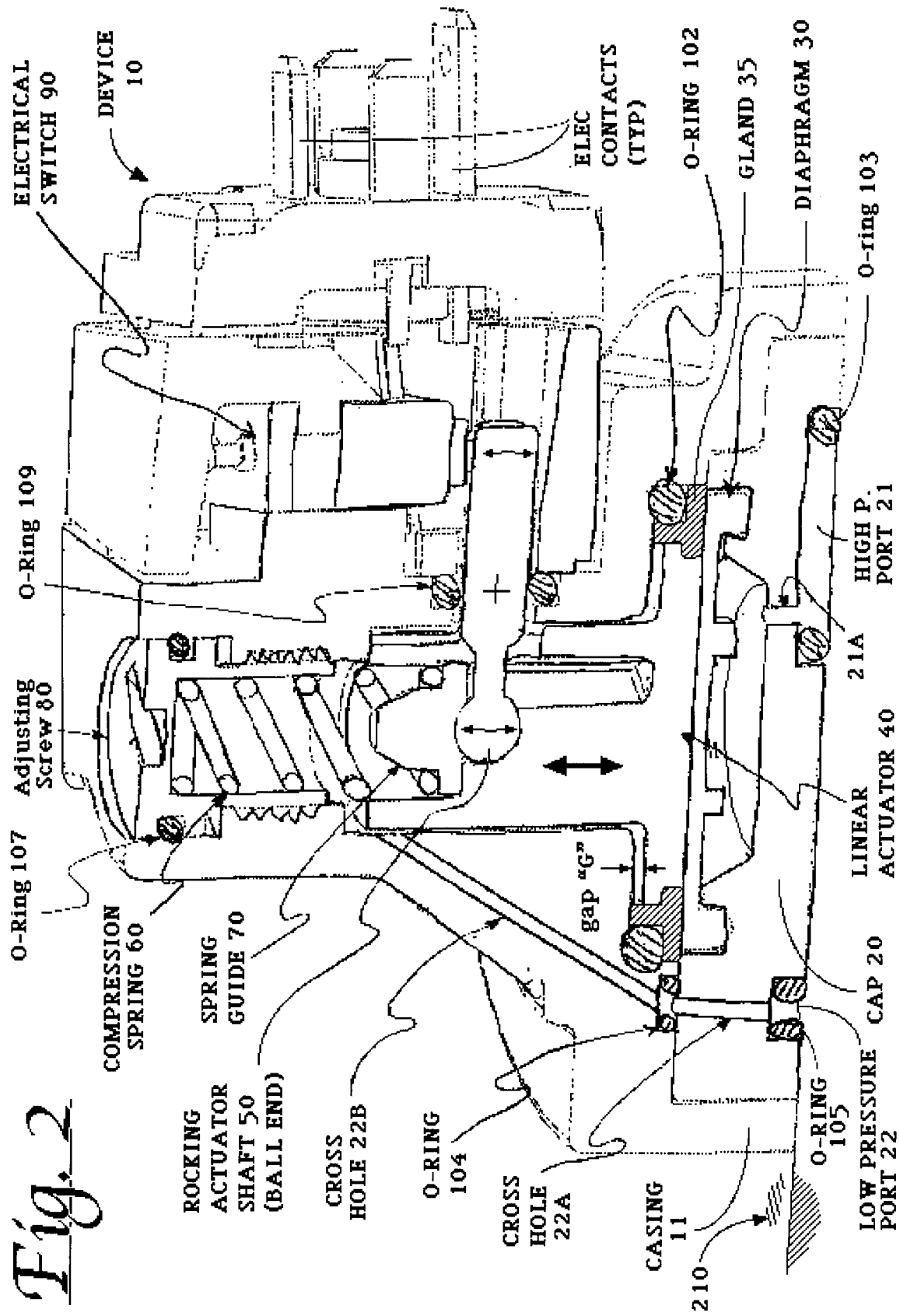
FIG. 2 is a cross-sectional view of a pressure device 10 according to the present invention, showing the pressure device in its unpressurized position.

FIG. 2 is a cross-sectional view of a pressure device 10 according to the present invention, showing the pressure device in its unpressurized position.

The casing 11 is generally configured to provide containment, sealing, and protection for various elements therein. The casing 11 could also be thought of as a "body" or "frame" 11, in that it provides a basic framework to contain certain items and to define various passageways and cavities.

Figure 9:
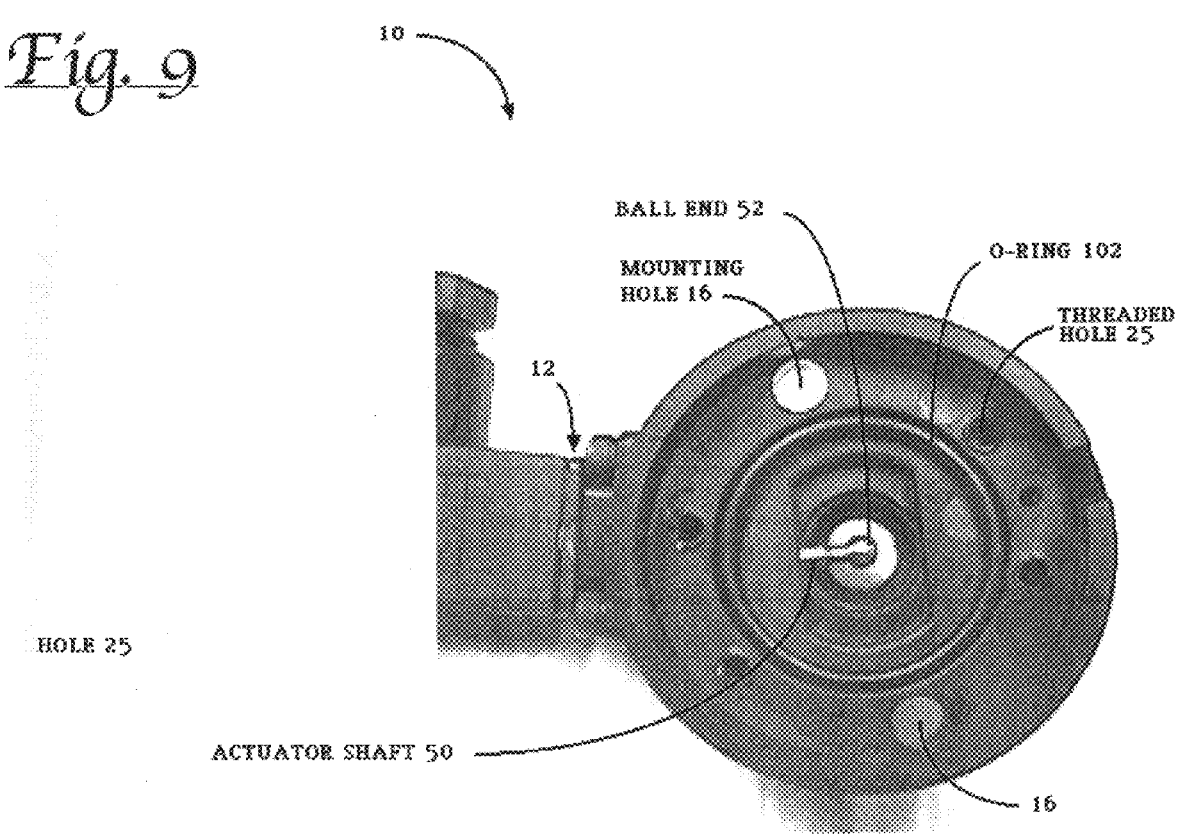
FIG. 9 is a view of the underside of the device 10, with the cap 20 removed, and the diaphragm 30 and gland removed, and the ball end 52 of the rocking actuator shaft 50 exposed. The linear actuator 40, spring guide 70, spring 60, etc., also have been removed from behind to expose the ball end 52 of the rocking actuator shaft 50.

The casing 11 could be thought of as having more than one section, in that it can be separated along various joint lines, such as designated at 12 in FIG. 9.

The diaphragm retaining cap 20 is configured to attach to the casing 11 and to provide an interface between the casing 11 and the filtration device 200. The diaphragm retaining cap 20 is attached by use of screws 25 or other suitable fasteners within a correspondingly-shaped cavity in the underside (as FIG. 1 is viewed) of the casing 11.

Figure 5:
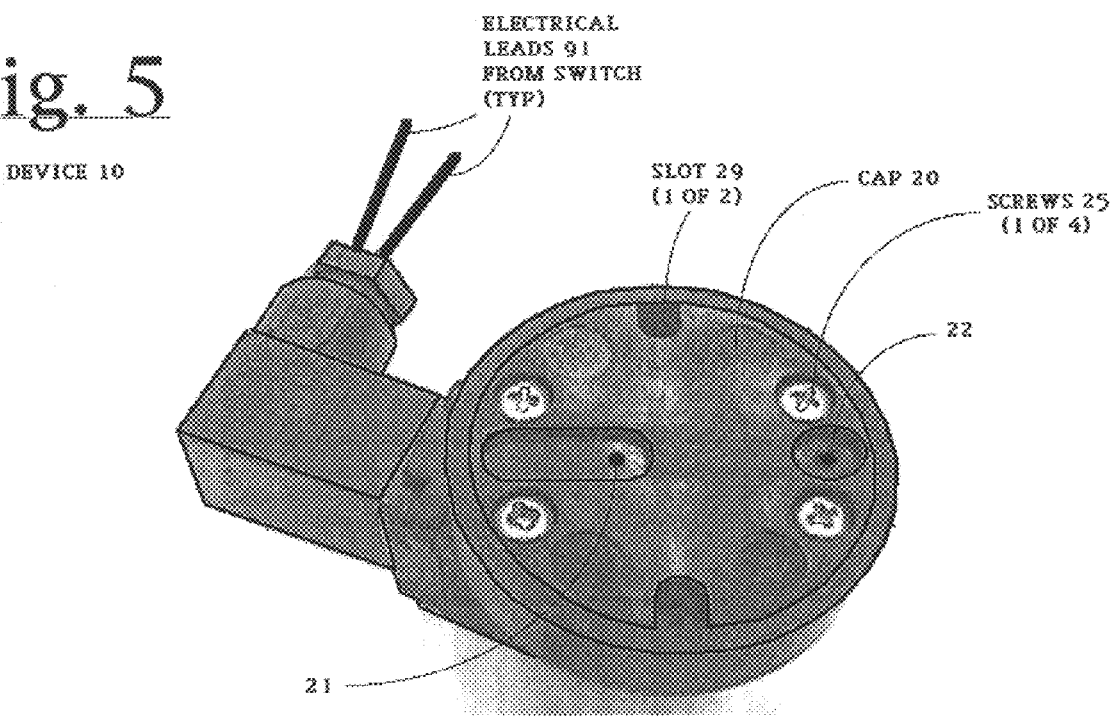
FIG. 5 is a pictorial view of the apparatus 10 of the invention, with a view made of the face of the cap 20, showing the low pressure inlet port 22 and the high pressure inlet port 21.
Figure 6:
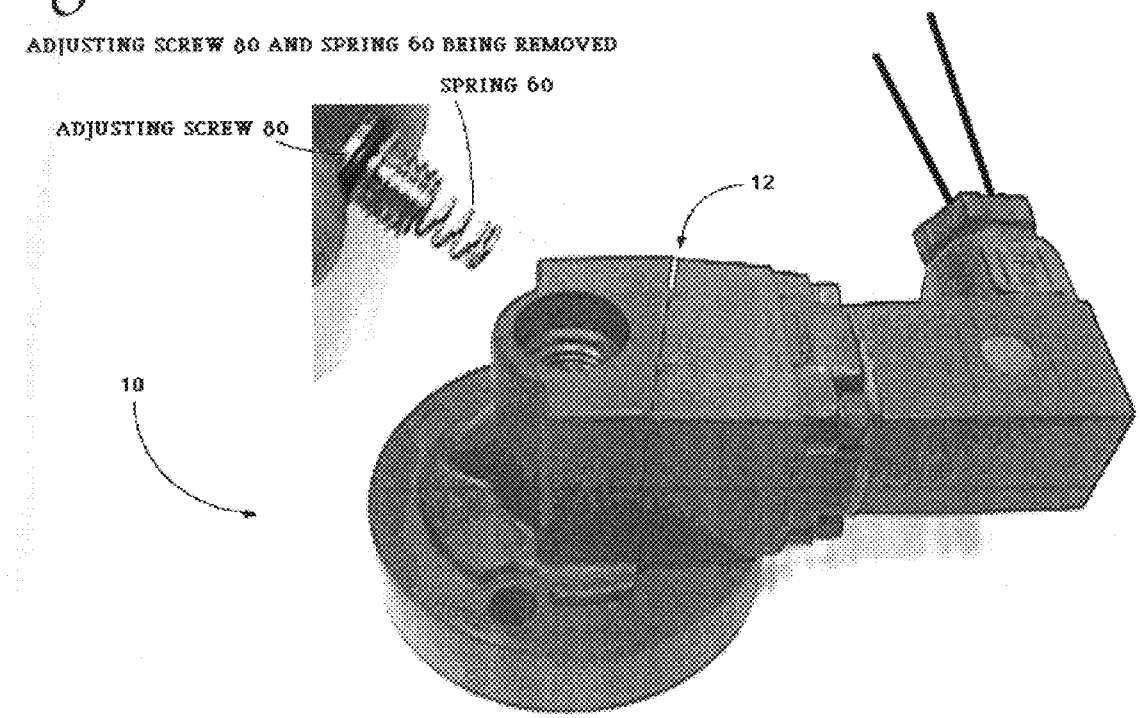
FIG. 6 is a pictorial view of the device of FIG. 5, except that the "top" of the device 10 is instead in view, with the spring 60 and screw 80 removed but the spring guide 70 still down in the threaded hole atop the ball end 52 of the rocking acutator shaft 50.
Figure 7:
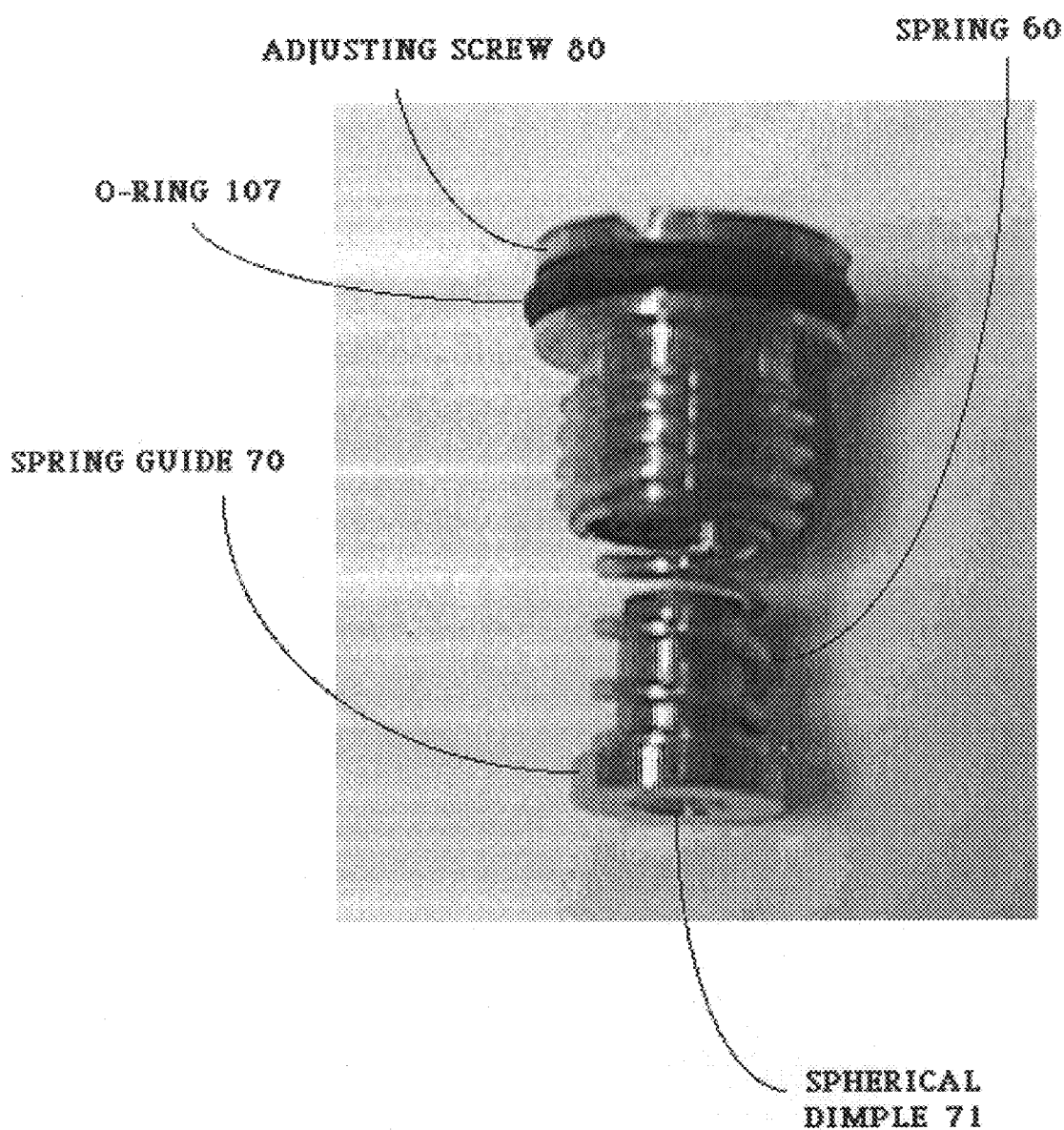
FIG. 7 is an isolated view of the adjusting screw 80, spring 60, spring guide 70 (having a spherical dimple 71 and an O-ring 107.
Figure 8:
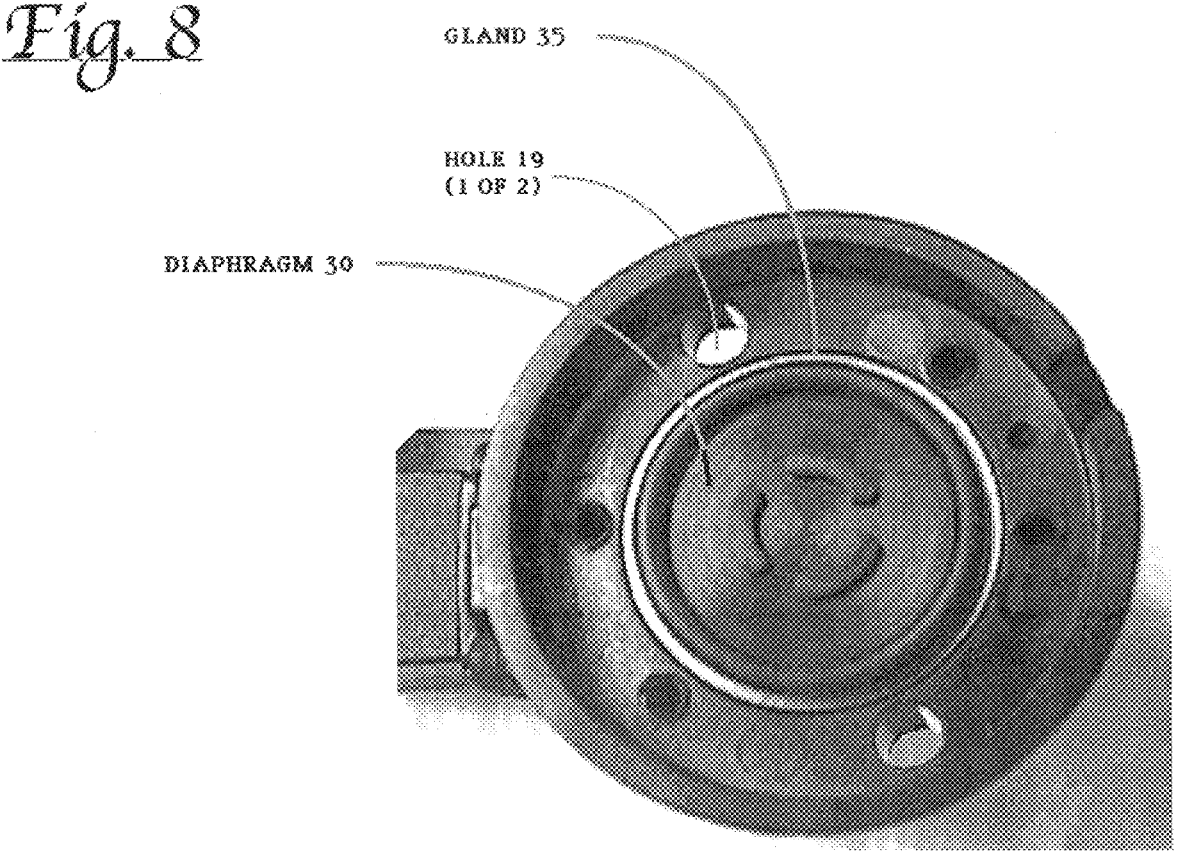
FIG. 8 is a view of the underside of the device 10, with the cap 20 removed, and the diaphragm 30 and gland exposed. The three unnumbered elements in the center of the diaphragm (on its high pressure side) are for purposes of keeping space from the adjacent cap, and may or may not be used.

FIG. 5 shows the use of Phillips-head screws 25 which attach the cap 20 to the casing 11. Each of these screws pass through holes 26 in the cap and threadably engage threaded holes 15 defined by the casing 11.

Fasteners (not shown) can be used to attach the device 10 to a supporting surface 210 such as shown in FIG. 2. Such fasteners can be machine screws or other similar fasteners, which pass through slots 29 of the cap 20 as well a holes 16 (see FIG. 9) in the casing 11.

The diaphragm 30 is captured between the diaphragm retaining cap 20 and a ringlike (aluminum) gland 35. As noted elsewhere, high pressure pushes on the rubber diaphragm 30, causing it to push upwardly on the linear actuator 40. If a suitable pressure differential exists to overcome the spring pressure, high pressure pushes on the rubber diaphragm 30 enough to cause it to bulge upwardly as shown in FIG. 4.

The linear actuator 40 is configured to move along a linear reciprocating path within the casing 11, with its location depending on the pressure differential sensed. Pressure from the lower pressure side pushes down on the linear actuator 40. When the linear actuator 40 is in its "down" position as shown in FIG. 1 (relatively low pressure differential), the electrical switch is open. When a relatively high pressure differential exists, the linear actuator 40 is in its "up" position (with gap G substantially closed), and the electrical switch 90 is closed, allowing for an electrical signal to be passed to a suitable location for use as a warning indication or control signal.

Generally stated, the linear actuator 40 can be thought of to include an elongate portion (which slides within a correspondingly-mating bore in the casing 11) and a flat portion which contacts and is pushed by the diaphragm 30. As shown in FIG. 9, the transverse cross section of the bore in the casing is not round, but instead is truncated on both sides. Such an irregular bore allows for proper axial alignment of the matching elongate portion of the linear actuator 40. As it can in one embodiment be manufactured from plastic, it may also be understood that it may be completely "solid" for production purposes known in the art; below the ball end of the rocking shaft in FIG. 2.

The rocking actuator shaft 50 includes a ball-type end which is configured to be captured into a socket defined by the linear actuator 40, which allows for some ball-socket movement between the ball end of the rocking actuator shaft 50 and the linear actuator 40. Such capturing is provided between the rocking actuator shaft 50 and the spring guide 70.

The ball end of the rocking actuator shaft 50 is configured to move with the upper end of the linear actuator 40. The other end of the rocking actuator shaft 50 is in contact with the electrical switch 90, and a medial portion of the rocking actuator shaft 50 is captured and sealed by use of an O-ring 109, with the O-ring 109 facilitating the rocking movement. As noted elsewhere, the rocking movement of the rocking actuator shaft 50 activates/deactivates the electrical switch 90. The O-ring 109 also provides a seal between the low pressure zone and the switch zone, which in the preferred embodiment is essentially open to atmospheric pressure.

Compression spring 60 is used in order to maintain bias upon the linear actuator such that it remains in the "down" position. The upper (as FIG. 2 is viewed) end of the spring is contained by a cylindrical hole in an adjusting screw 80. The lower end of the compression spring 50 is contained by an upwardly-extending tapered tip of the spring guide 70.

The spring guide 70 has an upwardly extending portion which fits within the hole in the lower end of the spring, and guides the spring force onto the knoblike end of the actuator shaft.

Fluid and Pressure Communication

Supply line pressure (high side) is allowed to engage the diaphragm 30 via port 21 and cross-hole 21A.

Downstream pressure (low side) is allowed to engage the opposite side of the diaphragm via port 22 and cross-holes 22A and 22B.

Sealing and O-Rings

O-ring 103 and the diaphragm 30 insure a pressure tight seal on the high pressure side. O-ring 102 may also provide some assistance.

O-rings 102, 104, 105, 107, 108 and 109 insure a pressure tight seal on the low pressure side.

Operation

When the filter within the filtration unit 200 is initially in its clean stage, the pressure differential between the high pressure line 201 and the low pressure line 202 is minimal. However, as the filter becomes clogged due to its intended function of accumulating impurities, the relative pressure on the downstream side (in the low pressure line 202) drops. As such pressure drops, the fluid pressure in the supply side (in the high pressure line 201) is eventually sufficient to overcome the bias spring force provided by the compression spring 60, in turn moving the linear actuator 40 upwardly as FIG. 2 is viewed. Such upward movement of the linear actuator 40 in turn rocks the rocking actuator shaft 50, and finally activates the electrical switch 90.

Adjustments

The pressure differential sufficient to cause the electrical switch to engage is adjustable via rotation of the adjusting screw 80 and/or by changing spring 60 to one having different properties.

Conclusion

Therefore it may be seen that the present invention provides an improved differential pressure switch having its supply pressure (a.k.a. the "high side") connected to the high pressure side of a fluid (e.g. air) filtration unit and its downstream (a.k.a. the "low side") connected to the low pressure port of a fluid filtration unit. As the filter becomes clogged a diaphragm within the improved differential pressure switch flexes, moving the actuator against spring resistance, which causes a pivoting motion of an actuator arm thus tripping the electrical switch.

The configuration according to the present invention provides improvements over the known prior art in that minimal frictional losses are provided during the transferring action, and little or no opposing friction is seen compared to dual diaphragm style units.

While this invention has been described in specific detail with reference to the disclosed embodiments, it will be understood that many variations and modifications may be effected within the spirit and scope of the invention as described in the appended claims.

We claim:

1. An apparatus for opening and closing an electrical circuit in response to a pressure differential between two locations, said apparatus comprising:
   a body defining a high pressure port and a low pressure port, said body also defining a high pressure zone in communication with said high pressure port, said body also defining a low pressure zone in communication with said low pressure port;
   a diaphragm partially defining said high pressure zone and partially defining said low pressure zone;
   an elongate rocking shaft rocking in response to variation in the pressure differential between said high pressure zone and said low pressure zone;
   an O-ring providing a seal and a pivot point for said rocking shaft, said O-ring also partially defining said high pressure zone; and
   a switch operated by said rocking motion of said rocking shaft, said switch isolated from both said high and low pressure zones.

2. The apparatus as claimed in claim 1, further comprising a spring for providing a spring force for maintaining said switch in a normally open position.

3. The apparatus as claimed in claim 2, wherein said spring force is adjustable.

4. The apparatus as claimed in claim 2, wherein said spring force is adjustable by use of a threaded adjustment screw.

5. The apparatus as claimed in claim 1, wherein said switch is exposed to the same pressure as the external surface of said apparatus.

6. The apparatus as claimed in claim 4, wherein said switch is exposed to the same pressure as the external surface of said apparatus.

7. An apparatus for opening and closing an electrical circuit in response to a pressure differential between two locations, said apparatus comprising:
   a body defining a high pressure port and a low pressure port, said body also defining a high pressure zone in communication with said high pressure port, said body also defining a low pressure zone in communication with said low pressure port;

a diaphragm partially defining said high pressure zone and partially defining said low pressure zone, said diaphragm being deformed to different shapes depending on the pressure differential between said high and low pressure zones;

a switch having an open and a closed position, said switch being isolated from both said high and low pressure zones, said switch operated in response to said deformation of said diaphragm such that said switch is switched between said open and closed positions when said pressure differential reaches a predetermined level;

an elongate rocking shaft having two opposing ends being a first end and a second end, said first end moving and said elongate rocking shaft rocking in response to said deformation of said diaphragm;

an O-ring providing a seal and a pivot point for said rocking shaft; and an electrical switch operated by said second end of said rocking shaft, said switch isolated from on of said high and low pressure zones at least in-part by said O-ring.

8. The apparatus as claimed in claim 7, wherein said pressure differential is between two liquids.

9. The apparatus as claimed in claim 7, wherein said pressure differential is between two gases.

10. The apparatus as claimed in claim 9, wherein said spring has open and closed positions, and further comprising a spring for providing a spring force for maintaining said switch in one of said open and closed positions.

11. The apparatus as claimed in claim 7, wherein said spring has open and closed positions, and further comprising a spring for providing a spring force for maintaining said switch in one of said open and closed positions.

12. The apparatus as claimed in claim 11, wherein said spring force is adjustable.

13. The apparatus as claimed in claim 12, wherein said spring force is adjustable by use of a threaded adjustment screw.

14. The apparatus as claimed in claim 13, wherein said switch is exposed to the same pressure as the external surface of said apparatus.

* * * * *